(12) United States Patent
Fossati et al.

(10) Patent No.: US 8,856,561 B2
(45) Date of Patent: Oct. 7, 2014

(54) ALLOCATING AND DISTRIBUTING POWER (75) Inventors: Humberto M. Fossati, Spring, TX (US);
Mitchell D. Callhan, Houston, TX (US);
Sheethal Lankipalle, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 181 days.

(21) Appl. No.: 13/468,701

(22) Filed: May 10, 2012

(65) Prior Publication Data
US 2013/0305064 A1    Nov. 14, 2013

(51) Int. Cl.
*G06F 1/26* (2006.01)

(52) U.S. Cl.
USPC ............................ 713/300; 713/330; 713/340

(58) Field of Classification Search
CPC .................................. G06F 1/26; G06F 1/226
USPC ......................................... 713/300, 330, 340
See application file for complete search history.

(56) References Cited

U.S. PATENT DOCUMENTS

| | | | |
|---|---|---|---|
| 6,735,640 B1 | 5/2004 | Kawabe | |
| 7,024,567 B2 * | 4/2006 | Kim et al. | 713/300 |
| 7,684,185 B2 | 3/2010 | Farrugia | |
| 8,127,066 B2 | 2/2012 | Abraham et al. | |
| 2006/0179335 A1 * | 8/2006 | Jang | 713/320 |
| 2008/0052546 A1 * | 2/2008 | Schindler et al. | 713/300 |
| 2008/0272932 A1 * | 11/2008 | Booker et al. | 340/854.9 |
| 2009/0003587 A1 * | 1/2009 | Smith et al. | 379/413 |
| 2009/0055672 A1 * | 2/2009 | Burkland et al. | 713/340 |
| 2011/0217873 A1 * | 9/2011 | Diab et al. | 439/620.01 |
| 2011/0264933 A1 * | 10/2011 | Forsythe | 713/320 |
| 2012/0023351 A1 * | 1/2012 | Wakrat et al. | 713/322 |
| 2012/0024949 A1 * | 2/2012 | Dong | 235/380 |
| 2012/0246458 A1 * | 9/2012 | Jain et al. | 713/100 |
| 2013/0044827 A1 * | 2/2013 | Vladan et al. | 375/257 |

FOREIGN PATENT DOCUMENTS

| | | |
|---|---|---|
| CN | 1722082 | 1/2006 |
| CN | 201237749 | 5/2009 |
| CN | 201540531 | 8/2010 |
| KR | 20030018675 | 3/2003 |

* cited by examiner

*Primary Examiner* — Vincent Tran (57) ABSTRACT

Example apparatus and methods to allocate and distribute power are disclosed. An example apparatus includes an availability calculator to determine first and second power allocations based on an available power. The example apparatus includes a distributer to supply a first power to a first device and to supply a second power to a second device. The example apparatus includes a power identifier provider to send an identifier of the second power allocation to the second device.

21 Claims, 8 Drawing Sheets

| IDENTIFIED LOAD | POWER |
|---|---|
| 100kΩ | 180W |
| 130kΩ | 150W |
| 169kΩ | 135W |
| 221kΩ | 120W |
| 294kΩ | 90W |
| 383kΩ | 65W |
| 590kΩ | 40W |

ALLOCATING AND DISTRIBUTING POWER

BACKGROUND

Consumer electronic devices such as computers, laptops, mobile devices, music players, etc. require power supplies to operate. Many different consumer electronic devices may utilize a variety of different manufacturers to obtain such power supplies. Amounts of power provided by different power suppliers may vary. Connections used by the power suppliers and/or the consumer electronic devices may also vary.

DETAILED DESCRIPTION

Example apparatus, articles of manufacture, and methods disclosed herein may be used to allocate and/or distribute power from a first device to a second device (e.g., a peripheral device). Examples disclosed herein enable the first device to power the second peripheral device, rather than requiring a separate power source for the second peripheral device, and to dynamically allocate power to the first device and second device. The examples disclosed herein provide for increased simplicity of use of devices by users. A user may connect a first device, such as a monitor, to a power supply and, rather than also obtaining a power supply for the second device, such as a notebook computer, the user may instead connect the second device to the first device for power. As disclosed herein, the first device may allocate power based on the amount of power supplied to it. Additionally and/or alternatively, in examples disclosed herein, more power may be allocated to the second device if and/or when the first device uses less power than the power allocated to it. In examples disclosed herein, the first device sends the second device an identifier of the power allocated to the second device. The identifier may be used by the second device to determine power allocation and/or use within the second device.

Many companies have started to use open work stations rather than assigning employees individual offices. For example, companies at which many employees travel may provide open cubicles for use by employees when they are working at the company office so that one employee may use a cubicle one day and another employee may use the same cubicle the second day. Rather than supplying each cubicle with a desktop computer, the company may equip each cubicle with a monitor and assign each employee a notebook computer. The examples disclosed herein enable the notebook computer to be connected to and/or powered by the monitor, rather than requiring a separate power source for the notebook computer.

A disclosed example apparatus to allocate and distribute power includes an availability calculator to determine first and second power allocations based on an available power. The example apparatus includes a distributer to supply a first power to a first device and to supply a second power to a second device. The example apparatus includes a power identifier provider to send an identifier of the second power allocation to the second device.

An example method to allocate and distribute power from a first device to a second device includes supplying first power to the first device and supplying second power to the second device. The example method includes sending an identifier of the second power allocation to the second device.

Figure 1:
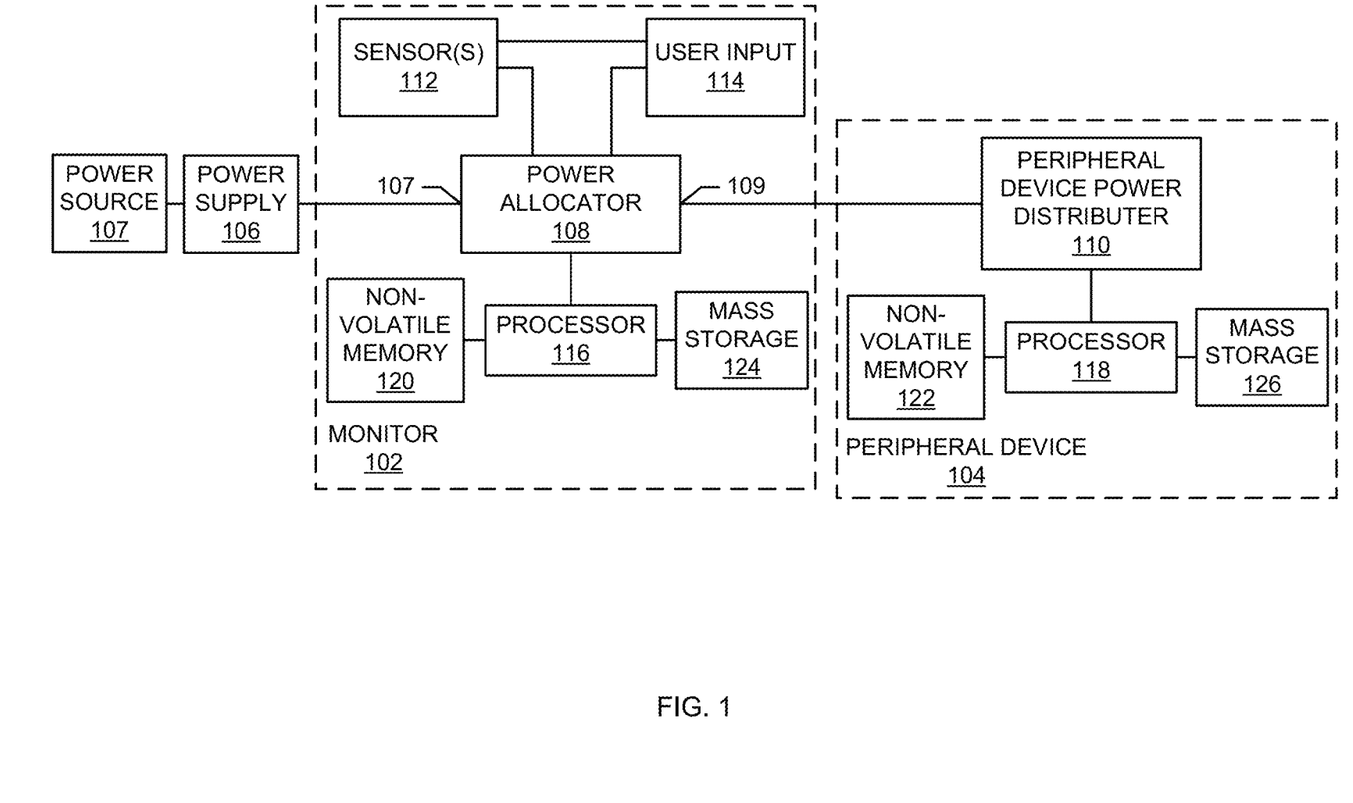
FIG. 1 depicts an example system implemented in accordance with the teachings of this disclosure to allocate and/or distribute power.

FIG. 1 illustrates an example system implemented in accordance with the teachings disclosed herein to allocate and/or distribute power from a first device to a second device. In the example of FIG. 1, a monitor 102 receives power from a power supply 106 and uses the power from the power supply 106 to power itself and a peripheral device 104. In addition to providing the peripheral device 104 with power, the monitor 102 of the illustrated example also provides data (e.g., an identifier) to the peripheral device 104 that identifies an amount of power that is to be provided to the peripheral device 104. The peripheral device 104 of the illustrated example uses the identifier to determine how to regulate, allocate, and/or control its own power use. To regulate, allocate and/or distribute power, the monitor 102 of the illustrated example includes a power allocator 108, sensor(s) 112, and a user input 114. The peripheral device 104 of the illustrated example includes a peripheral device power distributer 110 to receive power and the identifier from the monitor 102 and to control the power distribution and/or use within the peripheral device 104.

The power supply 106 of the illustrated example provides power to the monitor 102 via a wired connection 107. The power supply 106 may be, for example, an AC adapter that couples to a source of AC power (e.g., a power source 107) (e.g., via a wall outlet) and includes circuitry and/or a transformer to convert and/or condition the AC power to provide between 150 W and 180 W of conditioned power to the monitor 102. The power supply 106 of the illustrated example is monitored by and/or connected to the power allocator 108 within the monitor 102.

The peripheral device 104 of the illustrated example is powered by the monitor 102. The peripheral device 104 may be, for example, a notebook computer, a desktop computer, a gaming system, a mobile device, etc. The peripheral device 104 of the illustrated example is connected to the monitor 102 via a wired connection 109. Specifically, the peripheral device power distributer 110 of the peripheral device 104 is connected to the power allocator 108. While only one peripheral device 104 is shown in the example of FIG. 1, additional peripheral devices may be powered by the monitor 102.

In the illustrated example, the first device to receive and/or allocate power is the monitor 102. However, the first device may be any computing device and/or consumer electronic device (e.g., a notebook computer, a desktop computer, a gaming system, etc.). The power allocator 108 of the illustrated example receives and/or monitors conditioned power output by the power supply 106. The conditioned power received by the power allocator 108 may be a fixed amount (e.g., 150 watts (W)) or may vary based on a type of power supply 106 used (e.g., a first power supply may provide 150 W of power and a second power supply may provide 180 W of power). The power allocator 108 of the illustrated example determines an amount of conditioned power received from the power supply 106. To determine the amount of power received from the power supply 106, the power allocator 108 of the illustrated example measures a load at the connection 107 from the power supply 106 and uses the measured load to determine the conditioned power. In such examples, the power allocator 108 stores a power identification table listing a range of loads and power values corresponding to the loads. For example, if the power allocator 108 measures a load of 130 kilo-ohms (kΩ), the power allocator 108 may use the power identification table as a lookup table to determine that 150 W of power corresponds to the 130 kΩ load. An example power identification table is illustrated in FIG. 2B. The power supply 106 places the load on the connection 107 to the power allocator 108 to allow the power allocator 108 to determine the amount of power provided by the power supply 106. The power supply 106 may, for example, include a 130 kΩ resistor within the power supply 106 that the power allocator 108 may detect on the connection 107 to identify the power supply 106 as providing 150 W of power. In some examples, the power allocator 108 may measure a voltage and/or a current output by the power supply 106 and calculate the power using the equation P=IV (power equals the product of current (I) and voltage (v)). Once the power allocator 108 determines the amount of power provided by the power supply 106, the power allocator 108 of the illustrated example determines how to allocate the power between the monitor 102 and the peripheral device 104.

The power allocator 108 of the illustrated example may determine how to allocate the power between the monitor 102 and the peripheral device 104 in any of a variety of ways. For example, the power allocator 108 may set the power allocation for the peripheral device 104 to a fixed amount (e.g., 90 W). In some examples, the power allocator 108 sets the power allocation for the monitor 102 to a fixed amount (e.g., 60 W). In some examples, the user input 114 may be used to allow a user to determine how to allocate the power between the monitor 102 and the peripheral device 104. Once the power allocator 108 of the illustrated example has determined how to allocate the power between the monitor 102 and the peripheral device 104, the power allocator 108 distributes power to the monitor 102 and the peripheral device 104.

The power allocator 108 of the illustrated example provides data (e.g., an identifier) corresponding to the determined power allocation for the peripheral device 104 to the peripheral device 104. For example, if the power allocator 108 is to provide the peripheral device 104 with 90 W of power, the power allocator 108 also provides an identifier of that 90 W to the peripheral device 104. The peripheral device power distributer 110 uses the identifier to identify a maximum amount of power to be used by the peripheral device 104 and to determine how to allocate power use within the peripheral device 104. For example, if the identifier indicates that 90 W of power is being provided to the peripheral device 104, the peripheral device power distributer 110 may determine how to allocate that 90 W of power between processing at the peripheral device 104 (e.g., to allow a user to use the peripheral device 104), providing a certain screen brightness at the peripheral device 104, charging a battery at the peripheral device 104, etc., so that power use at the peripheral device 104 does not exceed the power allocation identified by the power allocator 108.

To provide the identifier of the power allocation for the peripheral device 104, the power allocator 108 of the illustrated example places and/or adjusts a load on the connection 109 to the peripheral device 104 indicative of the power allocation. As described above, the power allocator 108 of the illustrated example stores the power identification table listing a number of loads and power values corresponding to the loads. The power allocator 108 of the illustrated example uses this power identification table to determine the load to be placed on the connection 109 to the peripheral device 104. The power allocator 108 of the illustrated example places and/or adjusts a load on the connection 109 to the peripheral device 104 that corresponds to the power to be allocated to the monitor 102. For example, if the power allocator 108 is to allocate 60 W of power to the monitor 102, the power allocator 108 uses the power identification table to determine that the load corresponding to 60 W is 164 kΩ and the power allocator 108 places and/or adjusts the load on the connection 109 to the peripheral device 104 to 164 kΩ. The power allocator 108 of the illustrated example takes into account the load from the power supply 106 and adjusts the load on the connection 109 such that the total load measured by the peripheral device power distributer 110 will correspond to the power allocated to the peripheral device 104.

The peripheral device power distributer 110 of the illustrated example also stores the power identification table used by the power allocator 108. The peripheral device power distributer 110 of the illustrated example measures the load on the connection 109 from the power allocator 108 and uses the power identification table to determine the identifier of the power allocation for the peripheral device 104. The peripheral device power distributer 110 determines the identifier provided by the power allocator 108 in a manner similar to how the power allocator 108 determines the power provided by the power supply 106 (e.g., by measuring a load and accessing the lookup table to determine a power corresponding to the measured load). For example, the peripheral device power distributer 110 may measure a load of 294 kΩ (the sum of the 130 kΩ load from the power supply 106 and the 164 kΩ load from the power allocator 108). Using the power identification table, the peripheral device power distributer 110 determines that the power allocation corresponding to 294 kΩ is 90 W of power. The power allocator 108 of the illustrated example places and/or adjusts a load on the connection 109 to the peripheral device power distributer 110 such that the load measured by the peripheral device power distributer 110 will correspond to the power allocated to the peripheral device 104. One or more power identification table(s) may be used by the power allocator 108 and/or the peripheral device power distributer 110 to identify the amount of allocated power based on loads applied to various connections in the illustrated system. Additionally or alternatively, other forms of identifiers may be sent from the power allocator 108 to the peripheral device power distributer 110. For example, a code representative of the power allocations may be sent from the power allocator 108 to the peripheral device power distributer 110. In some examples, a power identifier is not used by the power allocator 108 and/or the peripheral device 104. In such examples, a fixed power amount may be provided to the peripheral device 104 by the monitor 102 without identifying the provided amount of power.

The power allocator 108 of the illustrated example adjusts the power allocations provided to the monitor 102 and the peripheral device 104 based on power use at the monitor 102.

Sensor(s) 112 of the illustrated example measure actual power consumption of the monitor 102 and provide the actual power consumption to the power allocator 108. The power allocator 108 may use the actual power consumption collected by the sensor(s) 112 to determine if more or less power should be provided to the monitor 102. For example, if less power is being used by the monitor 102 than the power allocated to it, the power allocator 108 of the illustrated example will reduce the power allocated to the monitor 102 and increase the power allocated to the peripheral device 104. The power allocator 108 may check the actual power consumption of the monitor 102 periodically or aperiodically. Additionally, the power allocator 108 may require the actual power consumption to be a certain threshold value higher and/or lower than the power allocated to the monitor 102 before adjusting set power allocations. Requiring the actual power consumption to be a certain threshold value higher and/or lower than the current power allocation prevents the power allocator 108 from too frequently (e.g., constantly) adjusting the power allocations to the monitor 102 and the peripheral device 104. Additionally or alternatively, the power allocator 108 may adjust the power allocations to the monitor 102 and the peripheral device 104 based on the user input 114. For example, a user may use the user input 114 to instruct the power allocator 108 to increase or decrease the power allocated to the monitor 102 and/or the peripheral device 104.

Additionally, in the illustrated example, the power allocator 108 informs the peripheral device 104 when actual power consumption of the monitor 102 and the peripheral device 104 (e.g., the sum of the power consumption at the monitor 102 and the power consumption at the peripheral device 104) reaches the amount of power available from the power supply 106. For example, if the power supply 106 provides 150 W of power and the monitor 102 consumes 60 W of power while the peripheral device 104 consumes 90 W of power, the power allocator 108 sends a signal to the peripheral device power distributer 110 indicating that power consumption has reached its limit. The peripheral device power distributer 110 of the illustrated example will adjust its power allocations within the peripheral device 104 (e.g., slow down processing, stop charging the battery, etc.) to avoid exceeding the power allocation identified by the power allocator 108. In the illustrated example, the power allocator 108 does not limit the actual power provided to the peripheral device 104, but instead relies on the peripheral device 104 to use no more power than that identified as allocated to it by the power allocator 108. In some examples where the peripheral device 104 does consume more power than that allocated to it by the power allocator 108, the power allocator 108 stops providing power to the peripheral device 104 if the actual power consumption of the monitor 102 and the peripheral device 104 reaches the amount of power available from the power supply 106.

In the illustrated example, the monitor 102 includes a processor 116, and the peripheral device 104 includes a processor 118. Each of the processors 116, 118 can be implemented by one or more microprocessors or controllers from any desired family or manufacturer. Also in the illustrated example, the monitor 102 and the peripheral device 104 include respective non-volatile memories 120, 122. The processor 116 of the illustrated monitor 102 is in communication with the power allocator 108 and the non-volatile memory 120. The processor 118 of the illustrated peripheral device 104 is in communication with the peripheral device power distributer 110 and the non-volatile memory 122. In some examples, the non-volatile memories 120, 122 store machine readable instructions that, when executed by the respective processor(s) 116, 118, cause the processor(s) 116, 118 to perform examples disclosed herein. In the illustrated example, the non-volatile memories 120, 122 may be implemented using flash memory and/or any other type of memory device. The monitor 102 and the peripheral device 104 of the illustrated example may also include one or more mass storage devices 124, 126 to store software and/or data. Examples of such mass storage devices 124, 126 include floppy disk drives, hard drive disks, compact disk drives and digital versatile disk (DVD) drives. The mass storage devices 124, 126 implement a local storage device. In some examples, the coded instructions of FIGS. 4, 5, and/or 6 may be stored in the mass storage devices 124, 126, in the non-volatile memories 120, 122, on a removable storage medium such as a CD or DVD, and/or on any other storage device.

Figure 2:
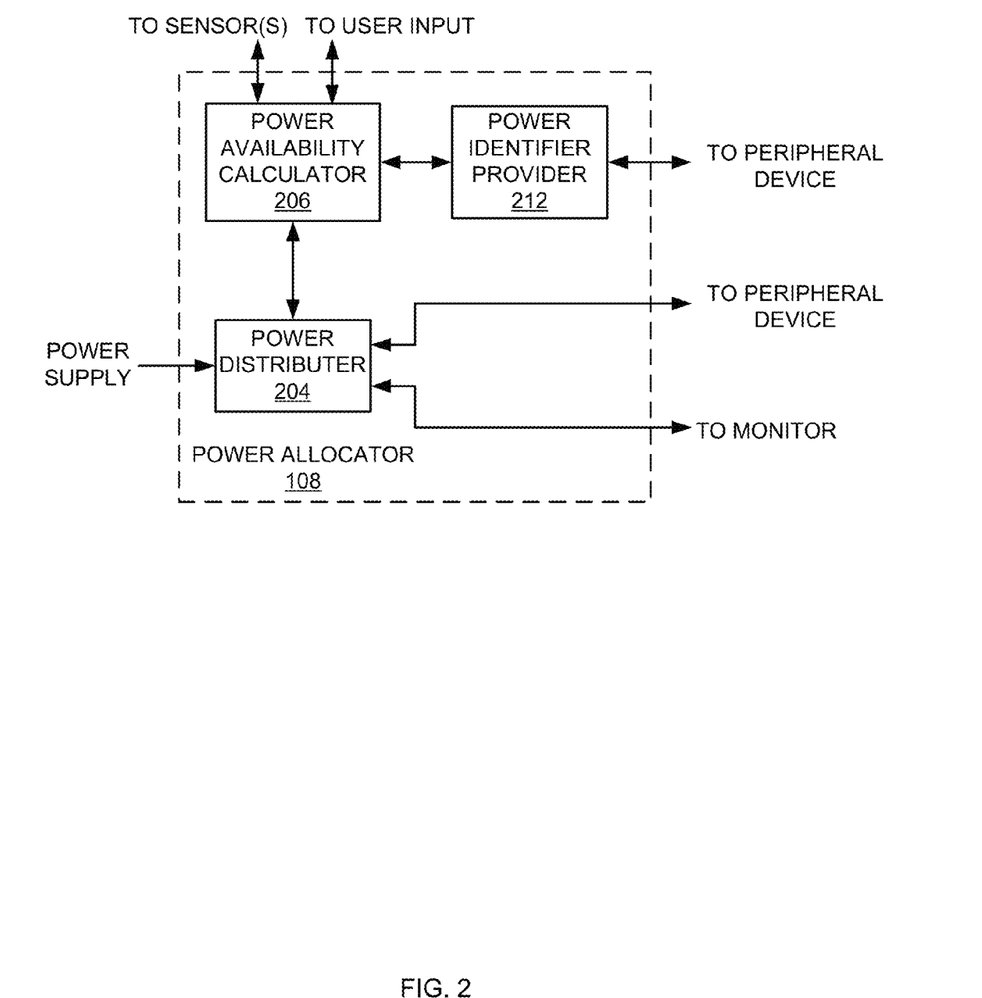
FIG. 2 depicts an example implementation of the power allocator of FIG. 1.

FIG. 2 is a block diagram of an example implementation of the power allocator 108 of FIG. 1. The power allocator 108 of the illustrated example is used to allocate and distribute power between a first device (e.g., the monitor 102 of FIG. 1) and a second device (e.g., the peripheral device 104 of FIG. 1). The power allocator 108 of FIG. 2 includes a power distributer 204, a power availability calculator 206, and power identifier provider 212. The power availability calculator 206 of the illustrated example determines a power provided to the power allocator 108 by a power supply (e.g., the power supply 106 of FIG. 1) and determines power allocations for the monitor 102 and the peripheral device 104. The power distributer 204 of the illustrated example provides power to the monitor 102 and the peripheral device 104 and the power identifier provider 212 of the illustrated example provides an identifier of the power allocation to the peripheral device 104. The power availability calculator 206 of the illustrated example also adjusts the power allocations between the monitor 102 and the peripheral device 104 based on actual power consumption at the monitor 102.

Figure 2A:
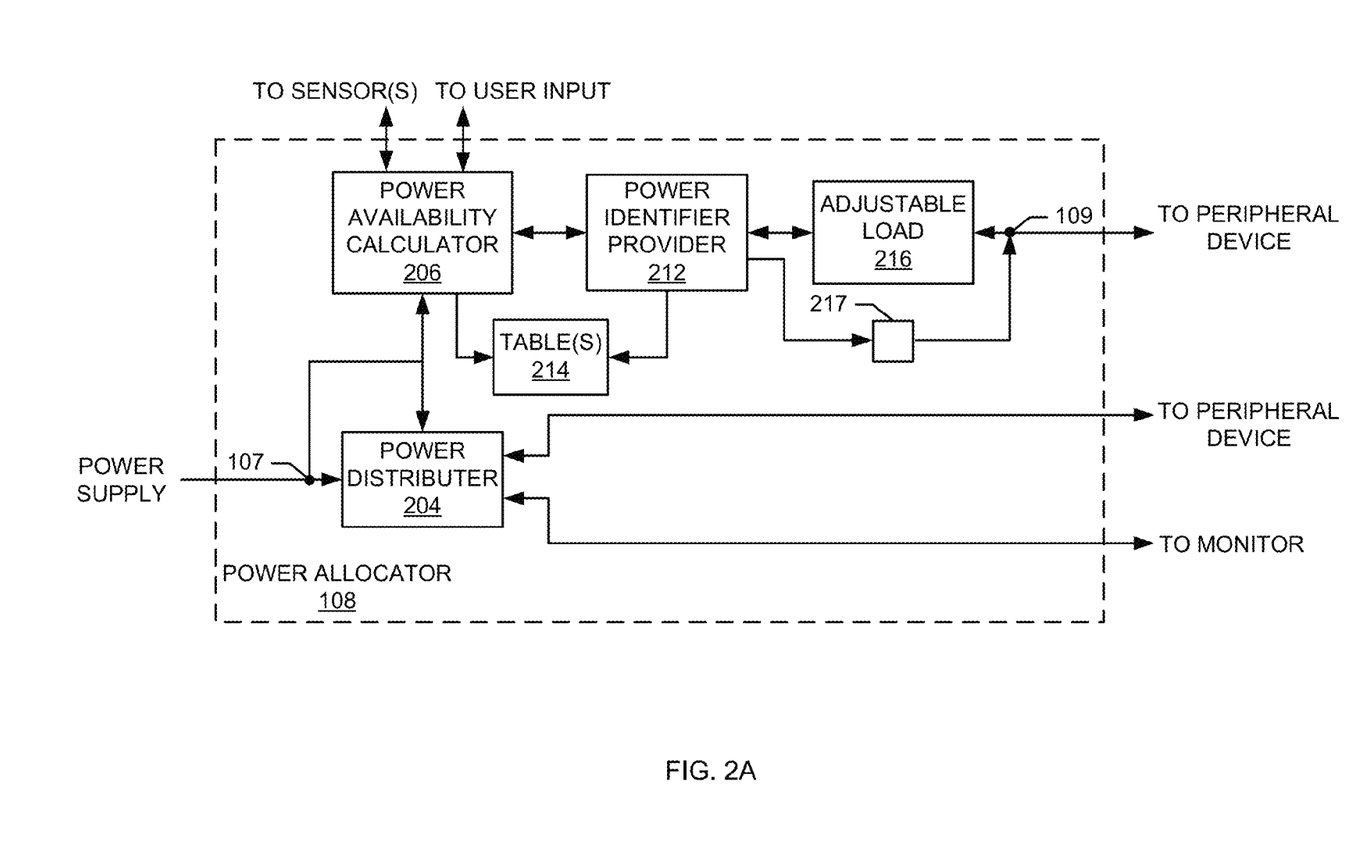
FIG. 2A depicts another example implementation of the power allocator of FIG. 1.
Figure 2B:
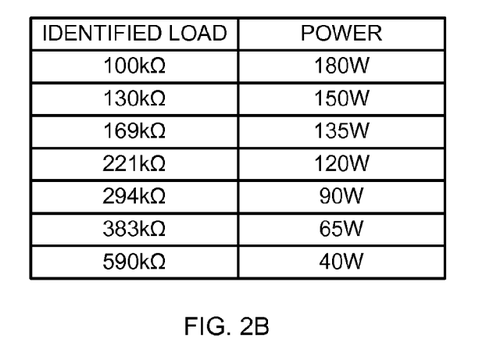
FIG. 2B depicts an example power identification table used by the example power allocator of FIG. 2A.

FIG. 2A is another block diagram of an example implementation of the power allocator 108 of FIG. 1. The power allocator 108 of the illustrated example includes the power distributer 204, the power availability calculator 206, the power identifier provider 212, table(s) 214, an adjustable load 216, and a switch 217.

The power distributer 204 of the illustrated example receives power from the power supply 106 via a wired connection (e.g., the wired connection 107 of FIG. 1). The power received by the power distributer 204 is dependent on the type of power supply 106 used (e.g., an AC adapter providing 150 W of power or an AC adapter providing 180 W of power).

The power availability calculator 206 of the illustrated example determines an amount of power received by the power distributer 204. In the illustrated example, the power availability calculator 206 measures a load at the connection 107 to the power distributer 204 and uses the measured load to determine the amount of power provided by the power supply 106. The table(s) 214 of the illustrated example store one or more power identification tables listing a variety of loads and power values corresponding to the loads. An example power identification table is illustrated in FIG. 2B. The power availability calculator 206 uses a power identification table to determine the power based on the measured load. For example, if the power availability calculator 206 measures a load of 130 kΩ, the power availability calculator 206 may use the power identification table to determine that 150 W of power corresponds to the 130 kΩ load and, thus, 150 W of power was received at the power distributer 204. The load present at the connection 107 to the power distributer 204 is used by the power availability calculator 206 to determine an identifier to be provided to the peripheral device 104 to indicate a power allocation to be provided to the peripheral device 104. Once the power availability calculator 206 of the illustrated example determines the amount of power received at the power distributer 204, the power availability calculator 206 of the illustrated example determines how to allocate the power between the monitor 102 and the peripheral device 104.

The power availability calculator 206 of the illustrated example determines how to allocate the power between the monitor 102 and the peripheral device 104 by setting the power allocation for the monitor 102 to a fixed amount (e.g., 60 W). In such an example, regardless of the amount of power available at the power distributer 204, the power availability calculator 206 allocates the fixed amount (e.g., 60 W) to the monitor 102. In such an example, the power availability calculator 206 sets the fixed amount of power to a threshold amount needed by the monitor 102 to operate fully (e.g., operate at a threshold screen brightness). Such a power allocation by the power availability calculator 206 ensures that the monitor 102 can function in its full capacity and any power provided to the peripheral device 104 is unneeded by the monitor 102. In other examples, the power availability calculator 206 sets the power allocation for the peripheral device 104 to a fixed amount (e.g., 90 W). In such examples, regardless of the amount of power available at the power distributer 204, the power availability calculator 206 allocates the fixed amount (e.g., 90 W) to the peripheral device 104.

The power availability calculator 206 of the illustrated example allocates the power such that most (e.g., all) of the power is distributed between the monitor 102 and the peripheral device 104 (e.g., the sum of the power allocated to the monitor 102 and the power allocated to the peripheral device 104 is the amount of power at the power distributer 204). In some examples, user input (e.g., the user input 114) is used to allow a user to determine how to allocate the power between the monitor 102 and the peripheral device 104.

The power identifier provider 212 of the illustrated example provides an identifier of the determined power allocation to the peripheral device 104 using the table(s) 214 and the adjustable load 216. The power identifier provider 212 of the illustrated example adjusts the adjustable load 216 to correspond to the power to be allocated to the monitor 102. For example, if the power availability calculator 206 is to allocate 60 W of power to the monitor 102, the power identifier provider 212 uses a power identification table stored at the table(s) 214 to determine that the load corresponding to 60 W is 164 kΩ and the power identifier provider 212 adjusts the adjustable load 216 on a connection (e.g., the connection 109) to the peripheral device 104 to 164 kΩ. The power identifier provider 212 of the illustrated example takes into account the load from the power supply 106 and adjusts the adjustable load 216 such that the load measured by the peripheral device 104 will correspond to the power allocated to the peripheral device 104. For example, the peripheral device 104 may measure a load of 294 kΩ (the sum of a 130 kΩ load from the power supply 106 and the 164 kΩ load from the adjustable load 216). Using a similar power identification table to the power identification table stored at the table(s) 214, the peripheral device 104 determines that the power allocation corresponding to 294 kΩ is 90 W of power. One or more power identification table(s) may be stored at the table(s) 214 to identify amounts of power based on loads. Additionally or alternatively, other forms of identifiers may be sent from the power identifier provider 212 to the peripheral device 104. For example, a digital value indicative of the power allocations may be communicated from the power identifier provider 212 to the peripheral device 104.

Once the power availability calculator 206 of the illustrated example has determined how to allocate the power between the monitor 102 and the peripheral device 104, the power availability calculator 206 instructs the power distributer 204 to distribute the power. In the illustrated example, the power distributer 204 does not control the amount of power distributed to the monitor 102 and the peripheral device 104, but instead the power allocator 108 of the illustrated example depends on the peripheral device 104 to not consume more power than the power allocated to it and identified by the power identifier provider 212. For example, the peripheral device 104 uses the identifier indicative of the power allocation for the peripheral device 104 (e.g., based on the load from the power supply 106 and adjustable load 216) to control its power consumption such that it does not exceed its power allocation.

Additionally, in the illustrated example, the power identifier provider 212 informs the peripheral device 104 when actual power consumption of the monitor 102 and the peripheral device 104 (e.g., the sum of the power consumption at the monitor 102 and the power consumption at the peripheral device 104) reaches the amount of power received at the power distributer 204 via the switch 217. For example, if the power distributer 204 receives 150 W of power from the power supply 106 and the monitor 102 consumes 60 W of power while the peripheral device 104 consumes 90 W of power, the power identifier provider 212 sends a signal to the peripheral device 104 via the switch 217 indicating that power consumption has reached its limit. The peripheral device 104 will adjust its power allocations within the peripheral device 104 (e.g., slow down processing, stop charging the battery, etc.) to avoid exceeding the power allocation identified by the power identifier provider 212. In some examples, the power distributer 204 stops providing power to the peripheral device 104 if the peripheral device 104 exceeds its power allocation and actual power consumption of the monitor 102 and the peripheral device 104 reaches the amount of power available from the power supply 106.

In some examples, the power distributer 204 distributes (e.g., divides) the power to the monitor 102 and the peripheral device 104 according to the power allocations determined by the power availability calculator 206. For example, if the power availability calculator 206 determines that 60 W of power is to be provided to the monitor 102 and 90 W of power is to be provided to the peripheral device 104, the power distributer 204 routes 60 W of the power to the monitor 102 and routes 90 W of the power to the peripheral device 104.

The power availability calculator 206 of the illustrated example adjusts the power allocations provided to the monitor 102 and the peripheral device 104 based on power use at the monitor 102. Sensors (e.g., sensor(s) 112) measure actual power consumption of the monitor 102 and provide the actual power consumption to the power availability calculator 206. The power availability calculator 206 of the illustrated example uses the actual power consumption collected by the sensor(s) 112 to determine if more or less power should be allocated to the monitor 102. For example, if less power is being used by the monitor 102 than the power allocated to it, the power availability calculator 206 of the illustrated example will reduce the power allocated to the monitor 102 and increase the power allocated to the peripheral device 104. If more power is needed by the monitor 102 than the power allocated to it, the power availability calculator 206 of the illustrated example will increase the power allocated to the monitor 102 and decrease the power allocated to the peripheral device 104. More or less power than the power allocated to the monitor 102 may be consumed by the monitor 102 because the power distributer 204 does not divide available power between the monitor 102 and the peripheral device 104 according to the power allocations. Less power may be consumed at the monitor 102 than the power allocated to it due to, for example, the monitor 102 being operated at a lower brightness level. More power may be required if, for example, a USB port of the monitor 102 is used by a user. The power availability calculator 206 may check the actual power consumption of the monitor 102 periodically or aperiodically. Additionally, the power availability calculator 206 may require the actual power consumption to be a certain threshold value higher and/or lower than the power allocated to the monitor 102 before adjusting set power allocations. The threshold value may be, for example, set to 10% of the power allocation to the monitor 102. Additionally or alternatively, the power availability calculator 206 may adjust the power allocations to the monitor 102 and the peripheral device 104 based on the user input 114. For example, a user may use the user input 114 to instruct the power availability calculator 206 to increase or decrease the power allocated to the monitor 102 and/or the peripheral device 104.

Once the power availability calculator 206 of the illustrated example determines that the power allocations should be altered, the power availability calculator 206 determines new power allocations for the monitor 102 and the peripheral device 104. For example, if the power availability calculator 206 determines that the monitor 102 is consuming 50 W instead of the 60 W originally allocated to it, the power availability calculator 206 changes the power allocation for the monitor 102 to 50 W and increases the power allocation for the peripheral device 104 by 10 W (60 W-10 W). In such an example, where the peripheral device 104 was originally allocated 90 W of power, the power availability calculator 206 will make the new power allocation for the peripheral device 104 100 W. Once the power availability calculator 206 of the illustrated example has determined the new power allocations for the monitor 102 and the peripheral device 104, the power identifier provider 212 adjusts the adjustable load 216 to reflect the new power allocations. Adjusting the adjustable load 216 allows the peripheral device 104 to measure a new load indicative of the new power allocation and the peripheral device 104 may adjust its internal power allocations based on the new power allocation.

Figure 2C:
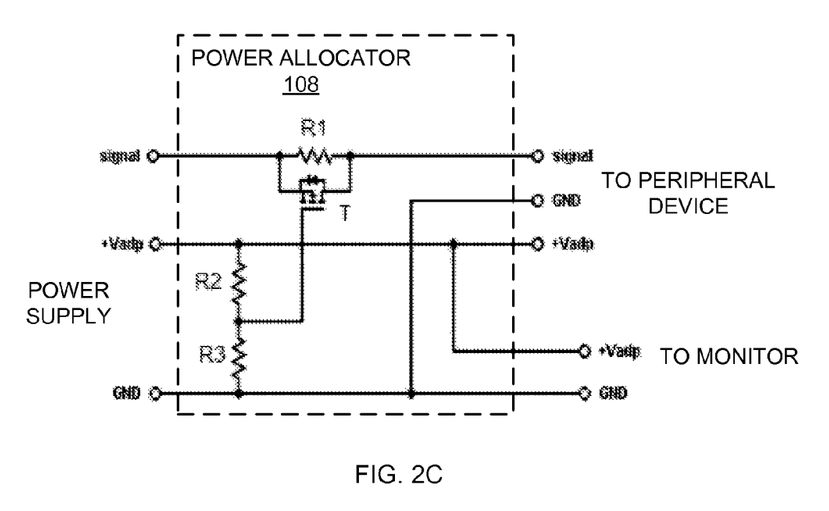
FIG. 2C depicts an example circuit diagram illustrating an example implementation of the example power allocator of FIG. 2A.

FIG. 2C is an example circuit diagram illustrating an example implementation of the example power allocator 108 of FIG. 2A. In the illustrated example, the resistor R1 is an adjustable and/or programmable resistor that corresponds to the adjustable load 216 that is adjusted by the power identifier provider 212 to provide the peripheral device 104 with an identifier of the power allocation for the peripheral device 104. In the illustrated example, the resistor R1 is adjusted to correspond to the power to be allocated to the monitor 102 based on correlations between loads and powers stored in a power identification table. For example, if the power availability calculator 206 is to allocate 60 W of power to the monitor 102, the power identifier provider 212 uses the power identification table stored at the table(s) 214 to determine that the load corresponding to 60 W is 164 kΩ and the power identifier provider 212 adjusts resistor R1 to 164 kΩ. The power identifier provider 212 adjusts resistor R1 such that the load measured by the peripheral device 104 will correspond to the power allocated to the peripheral device 104. For example, the power identifier provider 212 takes into account the load from the power supply 106 when adjusting resistor R1. The power identifier provider 212 adjusts the resistor R1 such that the sum of the load from the power supply 106 and the resistor R1 corresponds to the power allocation for the peripheral device 104 shown in the power identification table. For example, the peripheral device 104 may measure a load of 294 kΩ (the sum of a 130 kΩ load from the power supply 106 and the 164 kΩ load at the resistor R1).

In the illustrated example, the resistors R2 and R3 and the transistor T (e.g., which correspond to switch 217 of FIG. 2A) are used to enable the power identifier provider 212 to inform the peripheral device 104 when actual power consumption of the monitor 102 and the peripheral device 104 (e.g., the sum of the power consumption at the monitor 102 and the power consumption at the peripheral device 104) reaches the amount of power received at the power distributer 204 from the power supply 106. For example, if the power distributer 204 receives 150 W of power and the monitor 102 consumes 60 W of power while the peripheral device 104 consumes 90 W of power, a signal is sent by the power identifier provider 212 to the peripheral device 104 via the switch 217 indicating that power consumption has reached its limit. In the illustrated example, when power consumption reaches the amount of power received from the power supply 106, a voltage on the signal line rises, the transistor T is turned on, and a corresponding signal (e.g., an analog current) is sent to the peripheral device 104. The peripheral device 104 will adjust its power allocations within the peripheral device 104 (e.g., slow down processing, stop charging the battery, etc.) to avoid exceeding the power allocation identified by the power identifier provider 212 based on the received signal. Any amount and/or type of resistors R1, R2, and/or R3 or transistor T may be used by the power allocator 108 and the resistors R1, and/or R3 or transistor T may be adjustable. While FIG. 2C illustrates one example implementation of the example power allocator 108 of FIG. 2A, many other implementations of the example power allocator 108 may additionally or alternatively be used.

Figure 3:
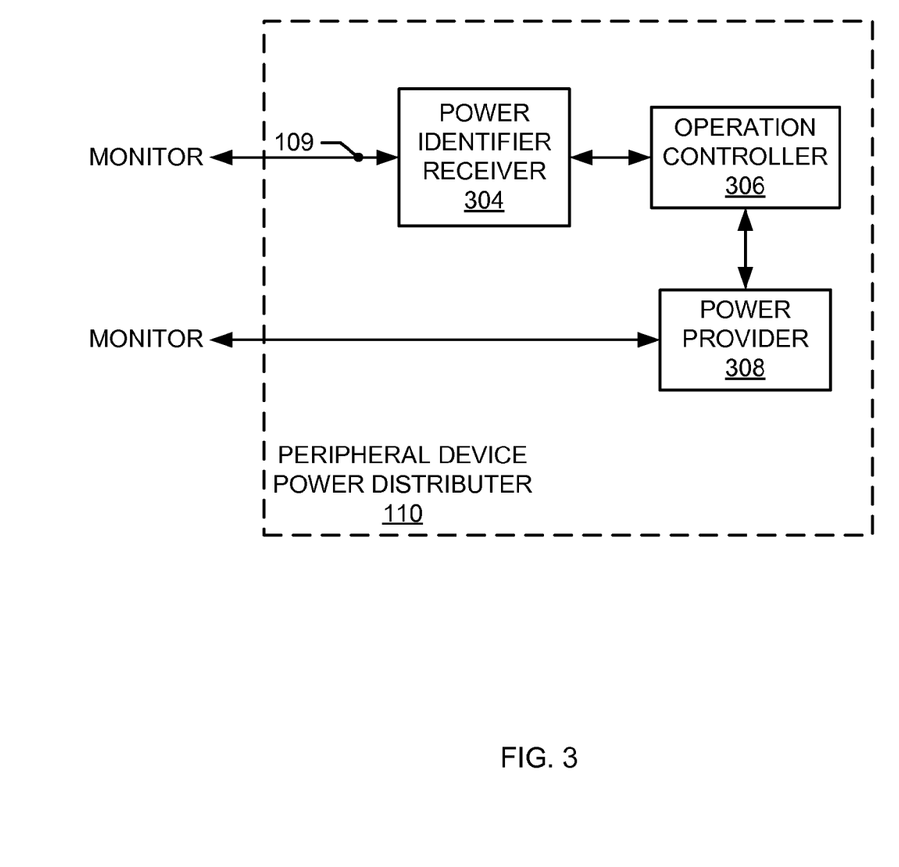
FIG. 3 is an example implementation of the peripheral device power distributer of the example system of FIG. 1.

FIG. 3 is a block diagram of an example implementation of the peripheral device power distributer 110 of FIG. 1. The peripheral device power distributer 110 of the illustrated example is located in a peripheral device (e.g., the peripheral device 104 of FIG. 1) and receives power and an identifier of a power allocation associated with the power from a monitor (e.g., the monitor 102 of FIG. 1). The peripheral device power distributer 110 of the illustrated example uses the identifier to determine how to allocate and/or control power use at the peripheral device 104. The peripheral device power distributer 110 of the illustrated example includes a power identifier receiver 304, an operation controller 306, and a power provider 308.

The power provider 308 of the illustrated example receives power from the monitor 102 via a wired connection. The power identifier receiver 304 of the illustrated example receives an identifier from the monitor 102. The identifier indicates an amount of power that is being provided to the peripheral device 104 from the monitor 102. To determine the power allocation indicated by the identifier, the power identifier receiver 304 of the illustrated example measures a load at a connection (e.g., the connection 109) from the monitor 102 and uses the measured load to determine the allocated power. The power identifier receiver 304 of the illustrated example stores a power identification table listing a variety of loads and power values corresponding to the loads. The power identification table stored by the power identifier receiver 304 is similar to the power identification table illustrated in FIG. 2A and used by the power allocator 108. For example, if the power identifier receiver 304 measures a load of 294.OMEGA., the power identifier receiver 304 may use the power identification table to determine that 90 W of power corresponds to the 294 k.OMEGA. load. Any other form of identifier may additionally or alternatively be used by the power identifier receiver 304.

The operation controller 306 of the illustrated example uses the identifier determined by the power identifier receiver 304 to determine how to allocate power use within the peripheral device 104. For example, if the identifier indicates that 90 W of power is being provided to the peripheral device 104, the operation controller 306 determines how to allocate that 90 W of power between processing at the peripheral device 104 (e.g., to allow a user to use the peripheral device 104), providing a certain screen brightness at the peripheral device 104, charging a battery at the peripheral device 104, etc. The identifier received by the power identifier receiver 304 allows the operation controller 306 to prioritize the various functions requiring power from the monitor 102. For example, if the operation controller 306 determines that processing is more important than charging a battery, the operation controller 306 will allocate enough power to the peripheral device 104 to perform full processing and will allocate any remaining power to the peripheral device 104 to charge the battery. In some examples, the operation controller 306 may slow down processing at the peripheral device 104. In some examples, a user may determine how the operation controller 306 allocates power use within the peripheral device 104. The power provider 308 of the illustrated example receives power from the monitor 102 and provides power to individual components and/or processes of the peripheral device 104 according to the allocations determined by the operation controller 306.

While example implementations of the example power allocator 108 and the example peripheral device power distributer 110 have been illustrated in FIGS. 2 and 3, one or more of the elements, processes and/or devices illustrated in FIGS. 2 and/or 3 may be combined, divided, re-arranged, omitted, eliminated and/or implemented in any other way. Further, the power distributer 204, the power availability calculator 206, the power identifier provider 212, the table(s) 214, the adjustable load 216, the switch 217, the power identifier receiver 304, the operation controller 306, the power provider 308, and/or, more generally, the example power allocator 108 of FIG. 2, the example power allocator 108 of FIG. 2A, and/or the example peripheral device power distributer 110 of FIG. 3 may be implemented by hardware, software, firmware and/or any combination of hardware, software and/or firmware. Thus, for example, any of the power distributer 204, the power availability calculator 206, the power identifier provider 212, the table(s) 214, the adjustable load 216, the switch 217, the power identifier receiver 304, the operation controller 306, the power provider 308, and/or, more generally, the example power allocator 108 of FIG. 2, the example power allocator 108 of FIG. 2A, and/or the example peripheral device power distributer 110 of FIG. 3 could be implemented by one or more circuit(s), programmable processor(s), application specific integrated circuit(s) ("ASIC(s)"), programmable logic device(s) ("PLD(s)") and/or field programmable logic device(s) ("FPLD(s)"), etc. When any of the apparatus or system claims of this patent are read to cover a purely software and/or firmware implementation, at least one of the power distributer 204, the power availability calculator 206, the power identifier provider 212, the table(s) 214, the adjustable load 216, the switch 217, the power identifier receiver 304, the operation controller 306, and/or the power provider 308 are hereby expressly defined to include a tangible computer readable medium such as a memory, DVD, compact disc ("CD"), etc. storing the software and/or firmware. Further still, the example power allocator 108 of FIG. 2, the example power allocator 108 of FIG. 2A, and/or the example peripheral device power distributer 110 of FIG. 3 may include one or more elements, processes and/or devices in addition to, or instead of, those illustrated in FIGS. 2, 2A, and/or 3, and/or may include more than one of any or all of the illustrated elements, processes and devices.

Figure 4:
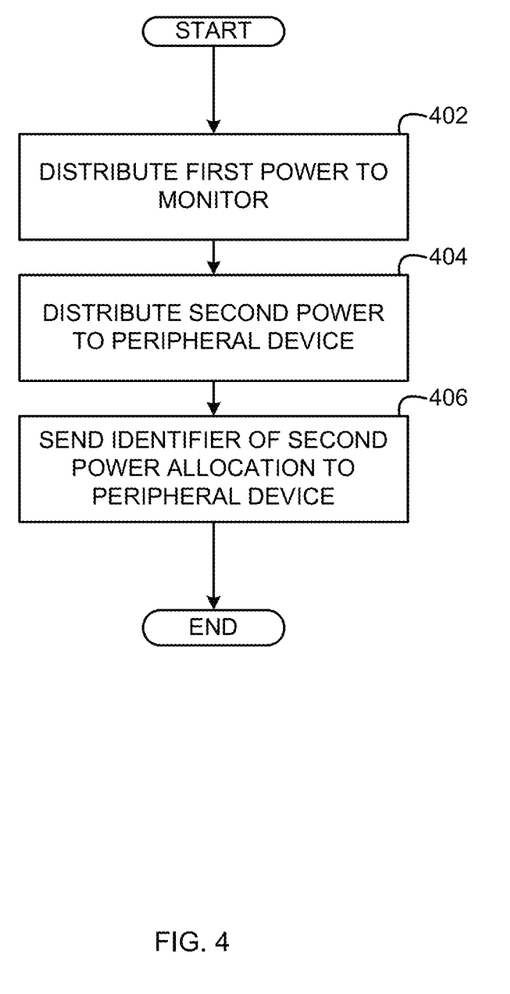
FIG. 4 is a flow diagram representative of example machine readable instructions that can be executed to implement the example power allocator of FIG. 2.
Figure 5:
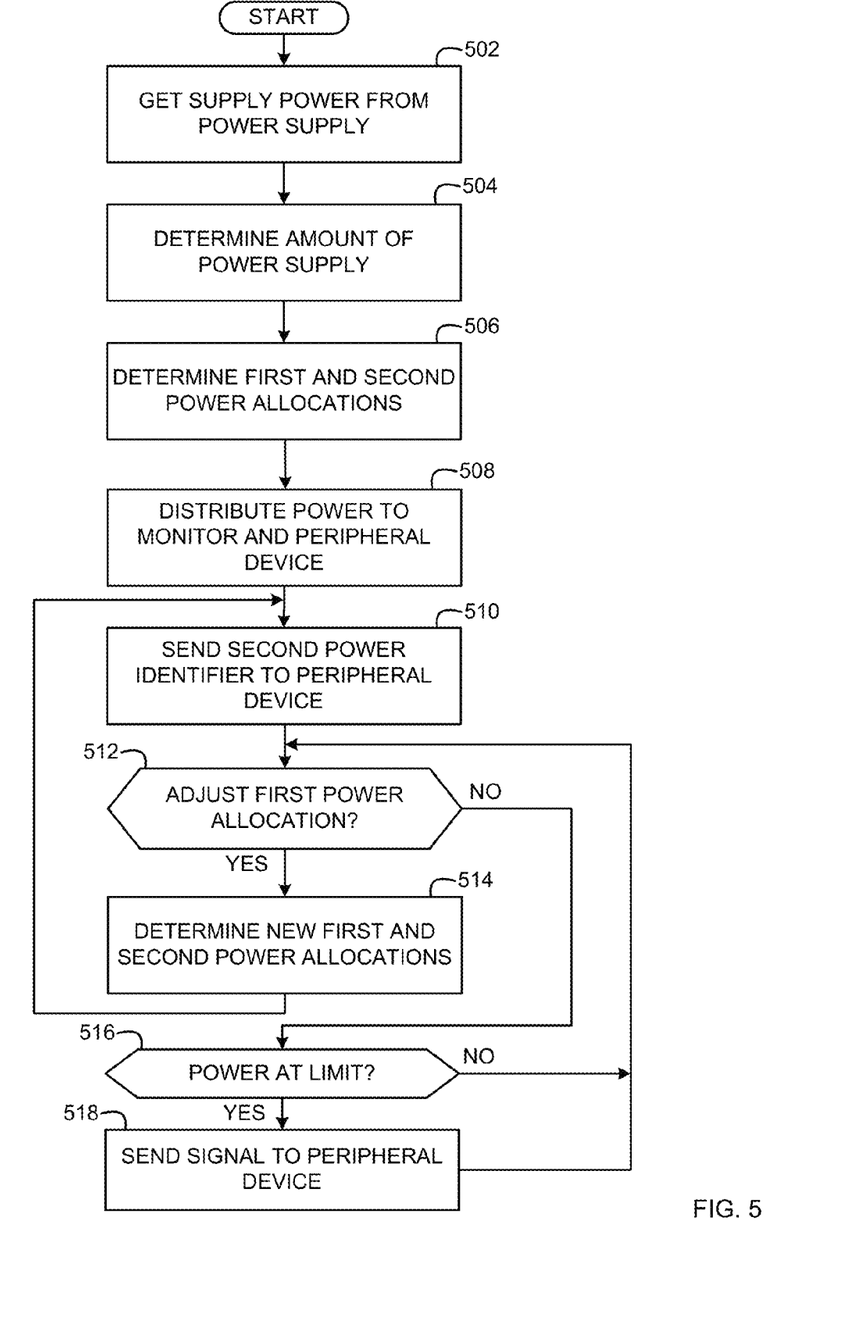
FIG. 5 is another flow diagram representative of example machine readable instructions that can be executed to implement the example power allocator of FIG. 2.
Figure 6:
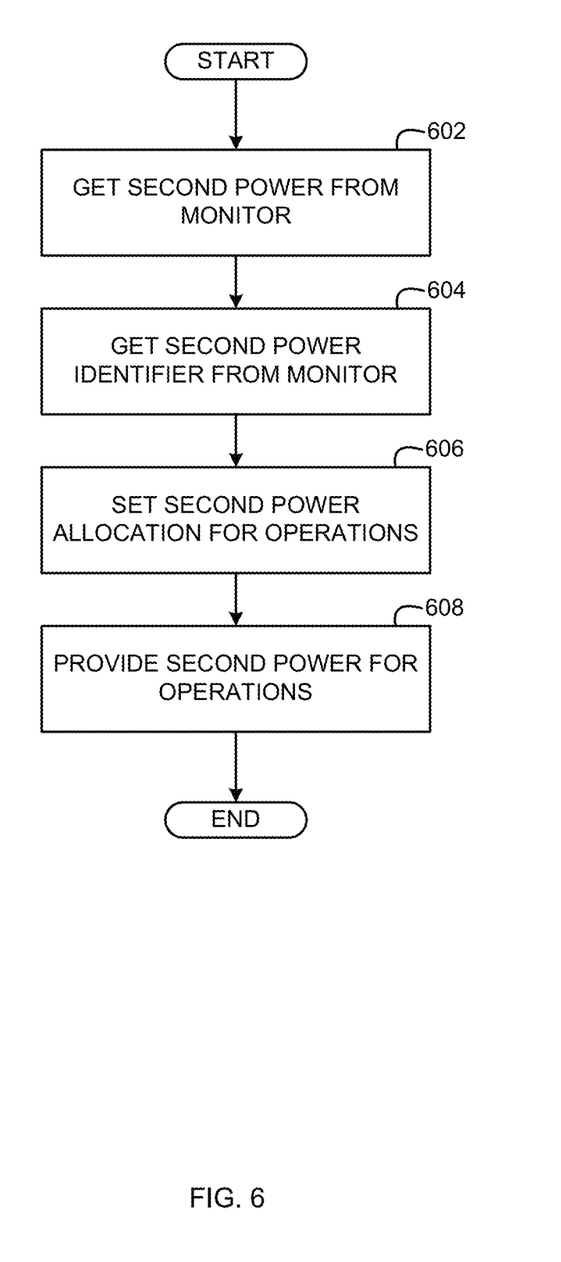
FIG. 6 is a flow diagram representative of example machine readable instructions that can be executed to implement the example peripheral device power distributer of FIG. 3.

Flowcharts representative of example machine readable instructions for implementing the example power allocator of FIG. 2 and/or FIG. 2A are shown in FIGS. 4 and 5 and a flowchart representative of example machine readable instructions for implementing the example peripheral device power distributer 110 of FIG. 3 is shown in FIG. 6. In these examples, the machine readable instructions comprise one or more programs for execution by one or more processors similar or identical to the processor(s) 116 and/or 118 of FIG. 1. The program(s) may be embodied in software stored on a tangible computer readable medium such as a compact disc read-only memory ("CD-ROM"), a floppy disk, a hard drive, a DVD, Blu-ray disk, or a memory associated with the processor(s) 116 and/or 118, but the entire program(s) and/or parts thereof could alternatively be executed by one or more devices other than the processor(s) 116 and/or 118 and/or embodied in firmware or dedicated hardware. Further, although the example program(s) is/are described with reference to the flowcharts illustrated in FIGS. 4, 5, and 6, many other methods of implementing the example system of FIG. 1, the example power allocator 108 of FIG. 2, the example power allocator 108 of FIG. 2A, and/or the example peripheral device power distributer 110 of FIG. 3 may alternatively be used. For example, the order of execution of the blocks may be changed, and/or some of the blocks described may be changed, eliminated, or combined.

As mentioned above, the example processes of FIGS. 4, 5, and/or 6 may be implemented using coded instructions (e.g., computer readable instructions) stored on a tangible computer readable medium such as a computer readable storage medium (e.g., a hard disk drive, a flash memory, a read-only memory ("ROM"), a CD, a DVD, a Blu-ray disk, a cache, a random-access memory ("RAM") and/or any other storage media in which information is stored for any duration (e.g., for extended time periods, permanently, brief instances, for temporarily buffering, and/or for caching of the information)). As used herein, the term tangible computer readable medium is expressly defined to include any type of computer readable storage and to exclude propagating signals. Additionally or alternatively, the example processes of FIGS. 4, 5, and/or 6 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

FIG. 4 is a flow diagram representative of example machine readable instructions that can be executed to implement the example power allocator 108 of FIG. 2. The power allocator 108 is used to allocate and distribute power between a first device (e.g., the monitor 102 of FIG. 1) and a second device (e.g., the peripheral device 104 of FIG. 1). Initially, the power distributer 204 distributes power to the monitor 102 (block 402). The power distributer 204 distributes power to the peripheral device 104 (block 404) and the power identifier provider 212 sends an identifier of a power allocation for the peripheral device 104 to the peripheral device 104 (block 406). The process then ends.

FIG. 5 is a flow diagram representative of example machine readable instructions that can be executed to implement the example power allocator 108 of FIG. 2A. The power allocator 108 is used to allocate and distribute power between a first device (e.g., the monitor 102 of FIG. 1) and a second device (e.g., the peripheral device 104 of FIG. 1). Initially, the power distributer 204 receives power from the power supply 106 via the wired connection 107 (block 502).

The power availability calculator 206 determines an amount of power received at the power distributer 204 (block 504). To determine the amount of power received at the power distributer 204, the power availability calculator 206 measure a load at the connection 107 at the power distributer 204 and use the measured load to determine the power based on a power identification table. Once the power availability calculator 206 determines the amount of power received at the power distributer 204 (block 504), the power availability calculator 206 determines how to allocate the power between the monitor 102 (e.g. a first power allocation) and the peripheral device 104 (e.g., a second power allocation) (block 506). In this example, the power availability calculator 206 sets the power allocation for the monitor 102 to a fixed amount (e.g., 60 W of power).

Once the power availability calculator 206 has determined how to allocate the power between the monitor 102 and the peripheral device 104 (e.g., has determined the first and second power allocations) (block 506), the power distributer 204 distributes power to the monitor 102 and the peripheral device 104 (block 508). The power identifier provider 212 provides an identifier of the determined power allocation (e.g., the second power allocation) to the peripheral device 104 (block 510).

The power availability calculator 206 determines if the power allocation for the monitor 102 should be adjusted based on power use at the monitor 102 (block 512). If the power availability calculator 206 determines that the power allocations should be altered, the power availability calculator determines new power allocations for the monitor 102 and the peripheral device 104 (block 514). Once the power availability calculator 206 determines the new power allocations for the monitor 102 and the peripheral device 104 (block 514), control returns to block 510 and the power identifier provider 212 provides an identifier of the new power allocation to the peripheral device 104. If the power availability calculator 206 determines that the power allocation for the monitor 102 should not be adjusted (block 512), the power identifier provider 212 determines if power consumption by the monitor 102 and the peripheral device 104 has reached the amount of power received at the power distributer 204 (block 516). If the power consumption by the monitor 102 and the peripheral device 104 has reached the amount of power received at the power distributer 204, the power identifier provider 212 sends a signal to the peripheral device 104 indicating that a maximum power consumption has been reached (block 518). If the power consumption by the monitor 102 and the peripheral device 104 has not reached the amount of power received at the power distributer 204 (block 516) or the maximum power consumption has been reach and the power identifier provider 212 sends a signal to the peripheral device 104 (block 518), control returns to block 512 to determine if the power allocations are to be adjusted.

FIG. 6 is a flow diagram representative of example machine readable instructions that can be executed to implement the example peripheral device power distributer 110 of FIG. 3. The peripheral device power distributer 110 is located in a peripheral device (e.g., the peripheral device 104 of FIG. 1) and receives power and an identifier of a power allocation associated with the power from a monitor (e.g., the monitor 102 of FIG. 1). The peripheral device power distributer 110 uses the identifier to determine how to allocate and/or control power use at the peripheral device 104.

Initially, the power provider 308 receives power (e.g., a second power) from the monitor 102 via a wired connection (block 602). The power identifier receiver 304 receives an identifier (e.g., a second power identifier) from the monitor 102 (block 604). The identifier indicates an amount of power that is being provided to the peripheral device 104 from the monitor 102. Once the power identifier receiver 304 identifies the power allocation (block 604), the operation controller 306 uses the identified power allocation to determine how to allocate power use to various operations within the peripheral device 104 (block 606). Once the operation controller 306 has determined how to allocate power use within the peripheral device 104 (block 606), the power provider 308 provides power to individual components and/or processes of the peripheral device 104 according to the allocations determined by the operation controller 306 (block 608). The process then ends.

Examples disclosed herein may be used to allocate and/or distribute power within a first device to a second peripheral device. Examples disclosed herein enable the first device to power the second peripheral device, rather than requiring a separate power source for the second peripheral device. The examples disclosed herein provide for increased simplicity of use of devices by users. In some examples, the first device may allocate power based on the amount of power supplied to it. Additionally and/or alternatively, in some examples disclosed herein, more power may be allocated to the second device if and/or when the first device uses less power than the power allocated to it.

Although certain methods, apparatus, and articles of manufacture have been described herein, the scope of coverage of this patent is not limited thereto. To the contrary, this patent covers all methods, apparatus, and articles of manufacture fairly falling within the scope of the claims of this patent either literally or under the doctrine of equivalents.

What is claimed is:

1. An apparatus located in a display monitor to allocate and distribute power, comprising:
   an availability calculator to:
      determine a first power allocation for the display monitor based on an available power;
      determine a second power allocation for a computing device different from the display monitor based on the available power and the first power allocation; and
      adjust the first and second power allocations when an actual power use at the display monitor crosses a threshold;
   a distributer to:
      supply a first power to the display monitor; and
      supply a second power to the computing device based on the available power and the first power, the second power to charge the computing device; and a power identifier provider to:
  identify an identifier corresponding to the second power allocation; and
  send the identifier to the computing device.

2. The apparatus of claim 1, wherein the availability calculator is to determine an amount of the available power.

3. The apparatus of claim 2, wherein a sum of the first power and the second power is equal to the amount of the available power.

4. The apparatus of claim 3, wherein the power identifier provider is to signal the computing device when the sum of the first power and the second power is equal to the amount of the available power, the signal to indicate the second power is in excess of the second power allocation.

5. The apparatus of claim 4, wherein the signal is sent to the computing device using a transistor.

6. The apparatus of claim 1, further comprising a sensor to determine the actual power use of the display monitor.

7. The apparatus of claim 1, wherein the availability calculator is to adjust the first and second power allocations based on a user input.

8. The apparatus of claim 1, wherein the identifier of the second power allocation is sent to the computing device by adjusting a load on a connection to the computing device.

9. A method to allocate and distribute power for a monitor and a second device different from the monitor, comprising:
  determining, at the monitor, a first power allocation for the monitor based on an available power;
  determining, at the monitor, a second power allocation for the second device based on the available power and the first power allocation;
  adjusting, at the monitor, the first and second power allocations when an actual power use at the monitor crosses a threshold value corresponding to the first power allocation;
  supplying first power to the monitor;
  supplying second power to the second device; and
  sending an identifier of the second power allocation to the second device.

10. The method of claim 9, wherein the second device comprises a notebook computer, a desktop computer, a gaming system or a mobile device.

11. The method of claim 9, further comprising determining an amount of available power.

12. The method of claim 11, wherein a sum of the first power and the second power is approximately equal to the amount of available power.

13. The method of claim 12, further comprising providing a signal to the second device when the sum of the first power and the second power is equal to the amount of the available power, the signal to indicate the second power is in excess of the second power allocation.

14. The method of claim 13, wherein the signal is provided to the second device using a transistor.

15. The method of claim 9, further comprising determining the actual power use at the monitor via a sensor.

16. The method of claim 9, wherein sending the identifier of the second power allocation to the second device includes adjusting a load on a connection to the second device.

17. A tangible computer readable storage medium comprising instructions that, when executed, cause a display monitor to at least:
  determine a first power allocation for the monitor based on an available power;
  determine a second power allocation for a second device different from the monitor based on the available power and the first power allocation;
  adjust the first and second power allocations when an actual power use at the monitor crosses a threshold;
  supply first power to the monitor;
  supply second power to the second device; and
  send an identifier of the second power allocation to the second device.

18. The computer readable medium of claim 17, further comprising instructions that, when executed, cause the computing device to determine the actual power use of the monitor.

19. The computer readable medium of claim 17, further comprising instructions that, when executed, cause the computing device to provide a signal to the second device when a sum of the first power and the second power is equal to an amount of the available power, the signal to indicate the second power is in excess of the second power allocation.

20. The computer readable medium of claim 19, wherein the signal is provided to the second device using a switch.

21. The computer readable medium of claim 17, wherein the identifier of the second power allocation is sent to the second device by adjusting a load on a connection to the second device.

* * * * *